United States Patent
Gan et al.

(10) Patent No.: US 12,460,104 B2
(45) Date of Patent: Nov. 4, 2025

(54) TWO-COMPONENT WATERBORNE POLYURETHANE COATING COMPOSITION AND LOW GLOSS COATING FORMED THEREFROM

(71) Applicant: GUANGDONG HUARUN PAINTS CO., LTD, Foshan (CN)

(72) Inventors: Yanchang Gan, Foshan (CN); Shigang Fan, Foshan (CN); Xi Zhao, Foshan (CN)

(73) Assignee: SHERWIN-WILLIAMS (GUANGDONG) NEW MATERIAL CO., LTD., Gunagdong (CN)

( * ) Notice: Subject to any disclaimer, the term of this patent is extended or adjusted under 35 U.S.C. 154(b) by 1000 days.

(21) Appl. No.: 17/413,005

(22) PCT Filed: Dec. 19, 2019

(86) PCT No.: PCT/CN2019/126608
§ 371 (c)(1),
(2) Date: Jun. 11, 2021

(87) PCT Pub. No.: WO2020/125714
PCT Pub. Date: Jun. 25, 2020

(65) Prior Publication Data
US 2022/0064479 A1    Mar. 3, 2022

(30) Foreign Application Priority Data
Dec. 21, 2018 (CN) .......................... 201811570831.7

(51) Int. Cl.
| | | |
|---|---|---|
| C09D 175/14 | (2006.01) | |
| C08G 18/62 | (2006.01) | |
| C08G 18/73 | (2006.01) | |
| C09D 7/42 | (2018.01) | |

(52) U.S. Cl.
CPC ....... *C09D 175/14* (2013.01); *C08G 18/6229* (2013.01); *C08G 18/73* (2013.01); *C09D 7/42* (2018.01)

(58) Field of Classification Search
CPC .... C09D 175/14; C09D 7/42; C08G 18/6229; C08G 18/73
See application file for complete search history.

(56) References Cited

U.S. PATENT DOCUMENTS

| | | |
|---|---|---|
| 7,211,622 B2 | 5/2007 | Uchida et al. |
| 7,833,584 B2 | 11/2010 | Geurts et al. |
| 2011/0306727 A1 | 12/2011 | Grablowitz et al. |

FOREIGN PATENT DOCUMENTS

| | | |
|---|---|---|
| CN | 1624015 | 6/2005 |
| CN | 101654589 | 2/2010 |
| CN | 102108232 | 6/2011 |
| CN | 102292363 | 12/2011 |
| CN | 103467639 | 12/2013 |
| CN | 104017169 | 9/2014 |
| CN | 104263184 | 1/2015 |
| CN | 104710913 | 6/2015 |
| CN | 105368222 | 3/2016 |
| CN | 107304327 | 10/2017 |
| CN | 105199049 | 12/2017 |
| CN | 107434842 | 12/2017 |
| CN | 108559029 | 9/2018 |
| CN | 108948994 | 12/2018 |
| CN | 109735219 | 5/2019 |
| EP | 0107378 | 5/1984 |
| WO | 0039181 | 7/2020 |

OTHER PUBLICATIONS

Extended European Search Report for European Patent Application No. 19898592.1 dated Jul. 29, 2022, 8 pages.
International Search Report for patent appl. No. PCT/CN2019/126608, Mar. 20, 2020 (16 pages including English Translation).
Tang et al. "Preparation and application research on waterborne two-component self-matting wood coatings" (China Coatings), vol. 32, No. 6, Jun. 30, 2017 (Jun. 30, 2017), pp. 5-8.

*Primary Examiner* — Angela C Scott
(74) *Attorney, Agent, or Firm* — Tucker Ellis LLP

(57) ABSTRACT

The present application is directed to a two-component waterborne polyurethane coating composition including: a film-forming resin composition, comprising an aqueous dispersion of hydroxyl acrylic polymer particles with a core-shell structure; and a polyisocyanate crosslinker, wherein the hydroxyl acrylic polymer particles with a core-shell structure includes a shell formed by a copolymer A and an inner core formed by a copolymer B; and wherein the copolymer A has a glass transition temperature ranging from −20° C. to 60° C., the copolymer B has a glass transition temperature ranging from 20° C. to 100° C., and the hydroxyl acrylic polymer particles with a core-shell structure have a glass transition temperature ranging from 10° C. to 90° C. The present application also relates to a low gloss coating formed by the two-component waterborne polyurethane coating composition.

14 Claims, 4 Drawing Sheets

Figure 1:
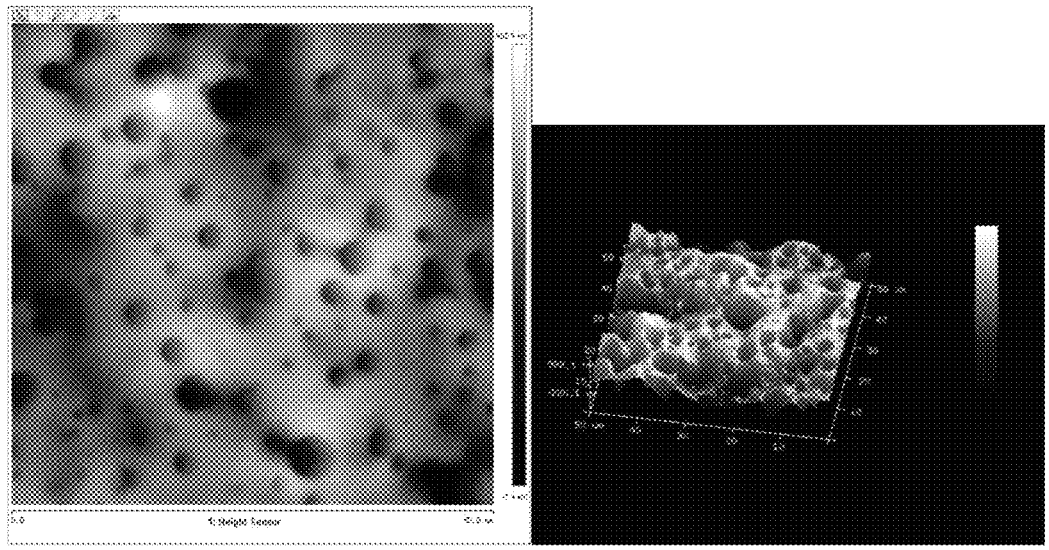

TWO-COMPONENT WATERBORNE POLYURETHANE COATING COMPOSITION AND LOW GLOSS COATING FORMED THEREFROM

TECHNICAL FIELD

The present application relates to a two-component waterborne polyurethane coating composition. The present application also relates to a low gloss coating obtained from the two-component waterborne polyurethane coating composition.

BACKGROUND

In recent years, with the enhancement of people's awareness of environmental protection and the improvement of environmental protection laws and regulations, water-based coatings have received more and more attention. Among them, two-component waterborne polyurethane coating composition, as an important water-based two-component coating, has the advantage of high performance and multi-function and is the development direction of water-based coatings. It has the advantages of low film forming temperature, strong adhesion, good abrasion resistance, high hardness, chemical resistance and good weather resistance, and the VOC is significantly reduced. The performance thereof is better than or equivalent to solvent-based two-component polyurethane coatings.

The two-component waterborne polyurethane coating composition is composed of an NCO group-containing polyisocyanate curing agent and an OH group-containing water-based polyol, and its coating film performance is mainly determined by the composition and structure of the aqueous polyol. The aqueous polyol includes acrylic polyol, polyester polyol, polyurethane or alkyd polyol, and can also be a hybrid mixture of two or more of the above polyol. Acrylic polyol has the advantages of low molecular weight, high hydroxyl functionality and small particle size, and it can be made into high-decorative paint having light color, excellent gloss and color retention, chemical resistance, strong anti-pollution performance and good outdoor weather resistance, with isocyanate prepolymer.

Matte coating (also known as low-gloss coating) has the characteristics of elegant and soft visual effect compared with high-gloss coating. It is especially suitable for architectural coating, especially interior wall architectural coating. With people's pursuit of high-quality life, there is an increasing demand for water-based matte coatings. At present, in the coating industry, low-gloss coatings are mainly obtained by adding a certain amount of matting agent to the coating composition. After the coating composition thus formed is formed into a film, the matting agent particles distributed in the film make the surface uneven, increase light scattering and reduce reflection, thereby producing a low-gloss matte effect. However, due to the limitation of the characteristics of the matting agent material itself, common matting agents such as micron-sized silica are difficult to disperse in the polymer emulsion, and it is easy to cause sedimentation in long-term storage. In addition, due to the poor transparency of the matting agent, it is easy to cause the paint film to turn white and reduce the permeability. At the same time, the matting agent has a strong thickening property, and the amount of addition is limited, and it is difficult to make a product with a lower gloss.

Therefore, there is still a need in the coating industry for a two-component waterborne polyurethane coating composition suitable for providing low-gloss coatings.

SUMMARY

In one aspect, the present application provides a two-component waterborne polyurethane coating composition including:
a film-forming resin composition, including an aqueous dispersion of hydroxyl acrylic polymer particles with a core-shell structure; and
a polyisocyanate crosslinker,
wherein the hydroxyl acrylic polymer particles with a core-shell structure include a shell formed by a copolymer A and an inner core formed by a copolymer B; and
wherein the copolymer A has a glass transition temperature ranging from −20° C. to 60° C., the copolymer B has a glass transition temperature ranging from 20° C. to 100° C., and the hydroxyl acrylic polymer particles with a core-shell structure have a glass transition temperature ranging from 10° C. to 90° C.

In another aspect, the present application provides a low gloss coating formed from the two-component waterborne polyurethane coating composition according to the present application, wherein the low gloss coating has a gloss of 75 or less at 60°

In yet another aspect, the present application provides a method for preparing an aqueous dispersion of core-shell hydroxyl acrylic resin polymer particles, which includes the following steps:
1) providing a monomer mixture for forming copolymer A: in the presence of water, emulsifier and a part of initiator, 1-20% by weight of the monomer mixture is added, relative to the total weight of the monomer mixture for forming the copolymer A, and then the remaining monomer mixture for forming copolymer A and the remaining initiator are added metrically for emulsion polymerization to obtain an aqueous emulsion containing the copolymer A, wherein the solid content of the aqueous emulsion is controlled within the range of 20-30% by weight; and
2) providing a monomer mixture for forming copolymer B: the monomer mixture for forming the copolymer B is used to swell the resulting aqueous emulsion, and then the monomer mixture for forming the copolymer B is subjected to an in-situ emulsion polymerization, to obtain an aqueous dispersion of hydroxyl acrylic polymer particles with a core-shell structure, wherein the hydroxyl acrylic polymer particles with a core-shell structure include copolymer A as the outer shell and copolymer B as the inner core, and wherein the solid content is controlled within the range of 30-45% by weight.

The inventor of the present application groundbreakingly provides a two-component waterborne polyurethane coating composition, including: a film-forming resin composition containing an aqueous dispersion of hydroxyl acrylic polymer particles with a specific core-shell structure, and a polyisocyanate crosslinker; in the absence of a matting agent, the two-component waterborne polyurethane coating composition can provide a low-gloss coating after curing, and the low-gloss coating has a gloss of 75 or less at 60°, which reduces or eliminates the negative effects (such as loss of coating fluidity) brought by the introduction of matting agents to reduce the gloss of the coating in the prior art.

The inventor of the present application was also surprised to find that the cured coating formed from such two-component waterborne w polyurethane coating composition has comparable or even better hardness and chemical resistance than conventional aqueous coating compositions.

The details of one or more embodiments of the disclosure are set forth in the following description. Other features, objects, and advantages of the disclosure will be apparent from the description and from the claims.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives. Unless otherwise indicated herein, the use of the singular forms herein is also intended to include the plural forms.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

In the present application, "low-gloss coating" refers to a coating with a gloss of 0.1 to 80, preferably 1 to 75, which is measured with a Sheen orifice gloss meter at a reflection angle of 60°.

When used in connection with the "two-component waterborne polyurethane coating composition", the term "no matting agent" means that the two-component waterborne polyurethane coating composition of the present application does not contain additional agents that can produce a matting effect, wherein the agents include, but are not limited to, micron-sized synthetic silica, micronized wax, stearate, talc/chlorite powder and other reagents known to those skilled in the art that can be used for matting.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

In the present disclosure, a numerical range defined by an endpoint includes all any numerical value within that range, for example, a range of 1 to 5 encompasses numerical values of 1, 1.5, 2, 2.75, 3, 3.80, 4, 5, and the like. Also, the disclosed range of values includes all sub-ranges within that broader range, for example a range of 1 to 5 includes sub-ranges of 1 to 4, 1.5 to 4.5, 1 to 2, and the like.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DRAWINGS DESCRIPTION

FIG. 1 schematically shows 2D and 3D diagrams of the surface of the paint film formed from a two-component waterborne polyurethane coating composition which is prepared by mixing the film-forming resin composition of Example 1 and the commercially available Bayhydur® XP 2655 curing agent at an OH/NCO molar ratio of 1/1.5.

Figure 2:
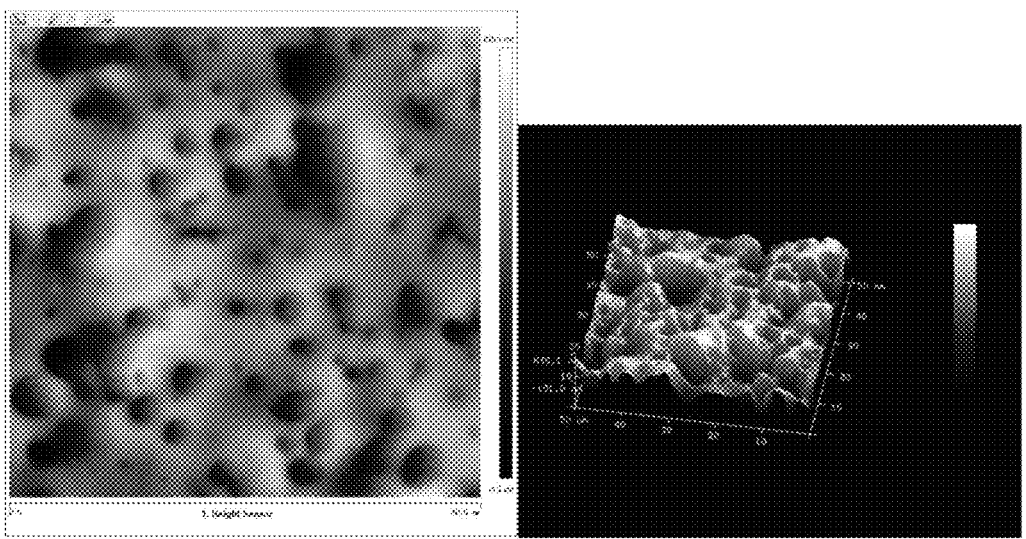

FIG. 2 schematically shows 2D and 3D diagrams of the surface of the paint film formed from a two-component waterborne polyurethane coating composition which is prepared by mixing the film-forming resin composition of Example 2 and the commercially available Bayhydur® XP 2655 curing agent at an OH/NCO molar ratio of 1/1.5.

Figure 3:
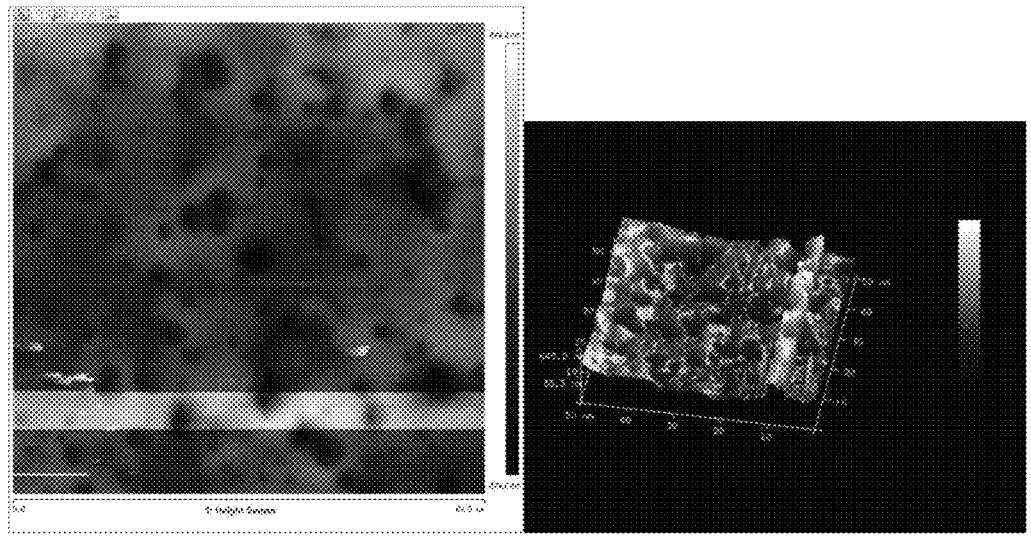

FIG. 3 schematically shows 2D and 3D diagrams of the surface of the paint film formed from a two-component waterborne polyurethane coating composition which is prepared by mixing the film-forming resin composition of Example 3 and the commercially available Bayhydur® XP 2655 curing agent at an OH/NCO molar ratio of 1/1.5.

Figure 4:
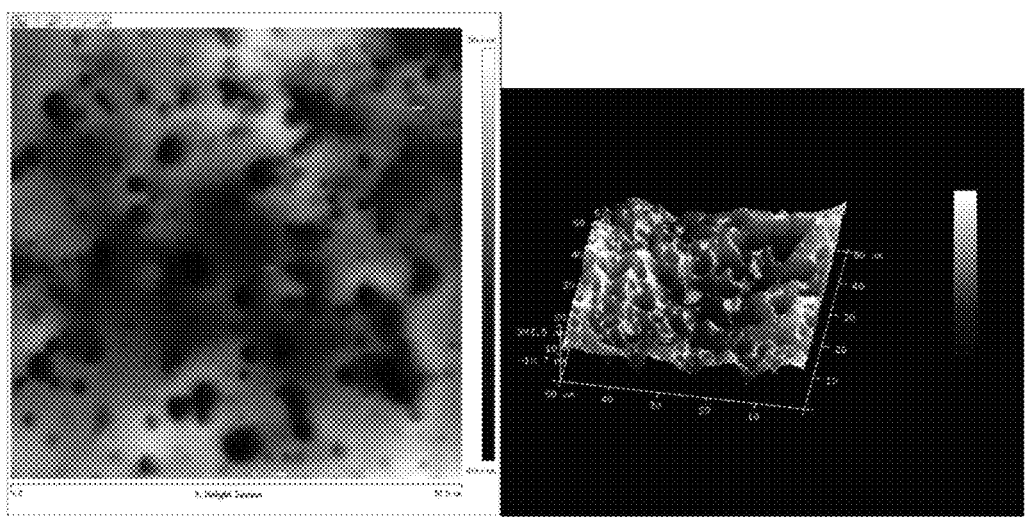

FIG. 4 schematically shows 2D and 3D diagrams of the surface of the paint film formed from a two-component waterborne polyurethane coating composition which is prepared by mixing the film-forming resin composition of Example 4 and the commercially available Bayhydur® XP 2655 curing agent at an OH/NCO molar ratio of 1/1.5.

Figure 5:
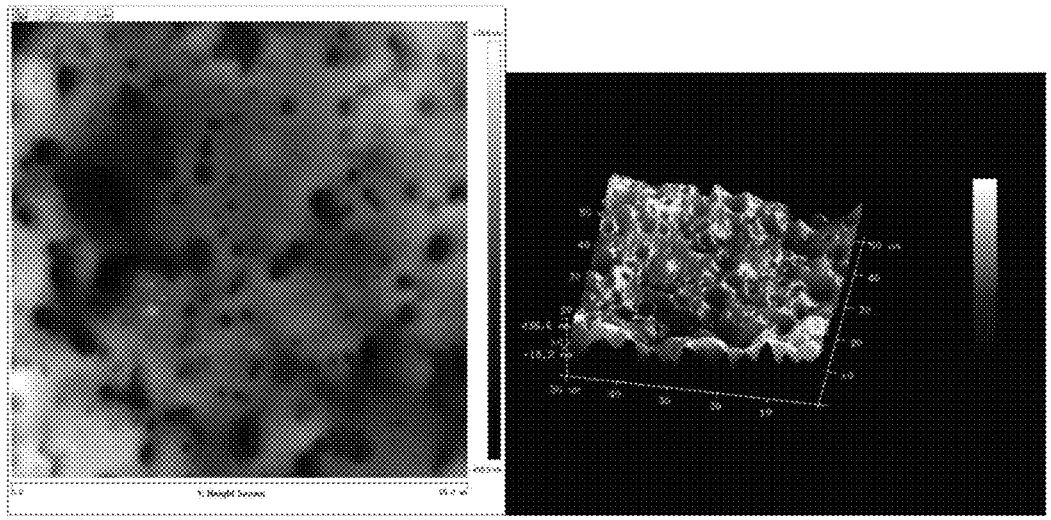

FIG. 5 schematically shows 2D and 3D diagrams of the surface of the paint film formed from a two-component waterborne polyurethane coating composition which is prepared by mixing the film-forming resin composition of Example 5 and the commercially available Bayhydur® XP 2655 curing agent at an OH/NCO molar ratio of 1/1.5.

Figure 6:
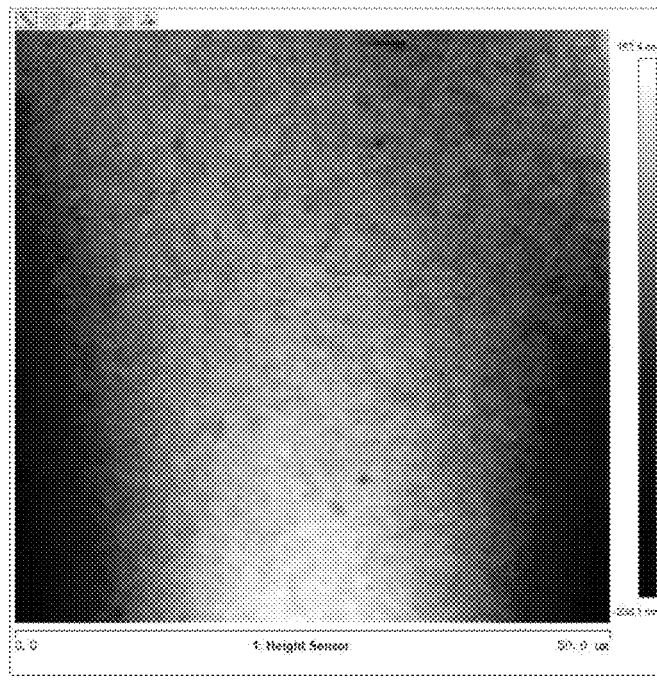

FIG. 6 schematically shows 2D diagrams of the surface of the paint film formed by mixing a commercially available aqueous hydroxyl-containing polyacrylic acid dispersion of Bayhydrol® XP 2470 and a commercially available Bayhydur® XP 2655 curing agent at an OH/NCO molar ratio of 1/1.5.

Figure 7:
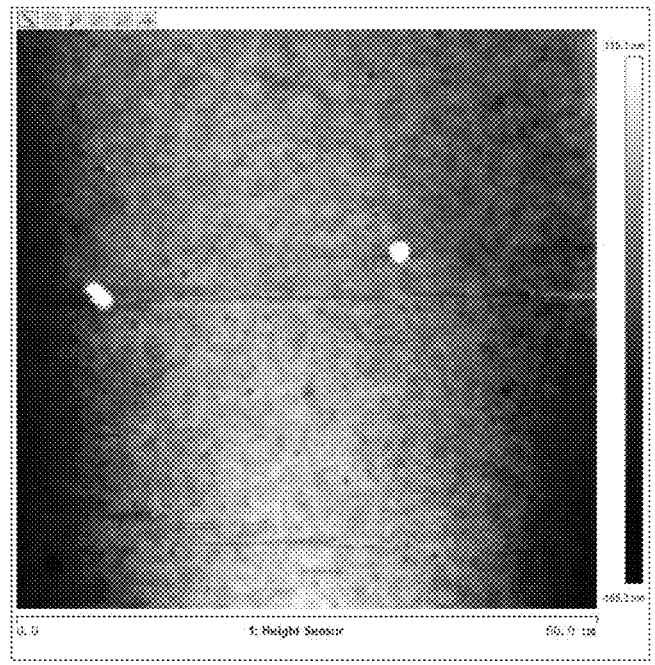

FIG. 7 schematically shows the surface 2D of the paint film formed by mixing the core-shell hydroxyl acrylic resin emulsion prepared according to Example 7 of CN107434842A and the commercially available Bayhydur® XP 2655 curing agent at an OH/NCO molar ratio of 1/1.5.

Figure 8:
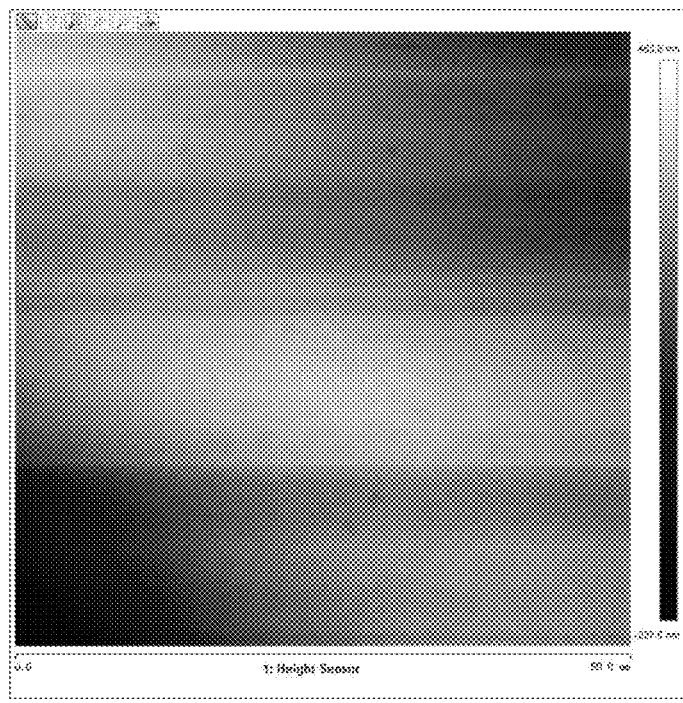

FIG. 8 schematically shows the surface 2D of the paint film formed by mixing the film-forming resin MT2008# from Guangdong Huaguoshan Environmental Protection Technology Co., Ltd. and the commercially available Bayhydur® XP 2655 curing agent at a molar ratio of OH/NCO of 1/1.5

DETAILED DESCRIPTION

In one aspect, the present application provides a two-component waterborne polyurethane coating composition including:

a film-forming resin composition, comprising an aqueous dispersion of hydroxyl acrylic polymer particles with a core-shell structure; and a polyisocyanate crosslinker, wherein the hydroxyl acrylic polymer particles with a core-shell structure comprise a shell formed by copolymer A and an inner core formed by copolymer B; and wherein the copolymer A has a glass transition temperature ranging from −20° C. to 60° C., the copolymer B has a glass transition temperature ranging from 20° C. to 100° C., and the hydroxyl acrylic polymer particles with a core-shell structure have a glass transition temperature ranging from 10° C. to 90° C.

Film-Forming Resin Composition

The term "film-forming resin composition" herein refers to the resin composition constituting the main body of the coating formed by the two-component waterborne polyurethane coating composition of the present application, and may comprise an aqueous dispersion of hydroxyl acrylic polymer particles with a core-shell structure, solvent and optional additional additives.

The film-forming resin composition, relative to the total weight of the film-forming resin composition, comprises about 20% to about 100% by weight, preferably about 30% to about 99% by weight, more preferably about 60% to about 90% by weight of an aqueous dispersion of hydroxyl acrylic polymer particles with a core-shell structure. Specifically, the film-forming resin composition, relative to the total weight of the film-forming resin composition, comprises about 25% by weight, about 35% by weight, about 45% by weight, about 55% by weight, about 65% by weight, about 75% by weight, about 85% by weight, about 95% by weight, or about 99% by weight of an aqueous dispersion of hydroxyl acrylic polymer particles with a core-shell structure.

In the hydroxyl acrylic polymer particles with a core-shell structure according to the present application, the outer shell is soft, and has a glass transition temperature (Tg) ranging from −20° C. to 60° C.

The term "Tg" herein stands for the glass transition temperature and is well known to be the temperature at which a polymer changes from a glassy, brittle state to a rubbery state. Tg values may be determined experimentally using techniques such as differential scanning calorimetry (DSC) or calculated using the Fox equation. Unless otherwise stated, the Tg values and ranges given herein are based on calculated Tg values using the Fox equation.

The Tg, in degrees Kelvin, of a copolymer having "n" copolymerized comonomers is given by the weight fractions W of each comonomer type and the Tg's of the homopolymers (in Kelvin) derived from each comonomer according to the Fox equation:

$$\frac{1}{Tg} = \frac{W_1}{Tg_1} + \frac{W_2}{Tg_2} + \ldots + \frac{W_n}{Tg_n}.$$

The calculated Tg in Kelvin may be readily converted to ° C.

Although not wishing to be bound by theory, the inventor believes that the Tg of the outer shell largely affects the ability of the aqueous dispersion of hydroxyl acrylic polymer particles with a core-shell structure as a film-forming resin to condense into a film. The lower the Tg of the shell, the better the flexibility of the shell will be, and the polymer particles can also condense into a film at a lower temperature. Moreover, in the coating process of the polymer particles, the soft shell can withstand the shearing action during the coating process without cracking. According to the present application, in order to obtain the desired film-forming properties and coating process resistance of the polymer particles, the copolymer shell is designed to have a lower Tg. In the embodiments of the present application, the copolymer shell of the polymer particles has a Tg of 60° C. or lower, preferably a Tg of 50° C. or lower, more preferably a Tg of 40° C. or lower, and even more preferably a Tg of 30° C. or lower Tg. Preferably, the copolymer shell of the polymer particles has a Tg of −20° C. or higher, more preferably a Tg of 0° C. or higher, and even more preferably a Tg of 5° C. or higher.

In a preferred embodiment of the present application, the polymer particles are designed to have a soft shell and hard core structure. Preferably, the glass transition temperature of the copolymer core is at least 10° C. higher than the glass transition temperature of the copolymer shell, preferably at least 15° C. higher, more preferably at least 20° C. higher, even more preferably at least 25° C. higher or higher.

In a specific embodiment of the present application, the aqueous dispersion of hydroxyl acrylic polymer particles with a core-shell structure according to experiments has a Tg ranging from 0 to 30° C., preferably, a Tg ranging from 10 to 30° C.

According to the present application, the acid value of the copolymer A is in the range of 3-40 mg KOH/g, the acid value of the copolymer B is in the range of 0-10 mg KOH/g, and the acid value of the hydroxyl acrylic polymer particles with a core-shell structure is in the range of 3-40 mg KOH/g. The acid value is measured by titration according to ISO 2114.

According to the present application, the hydroxyl value of the copolymer A is in the range of 40-150 mg KOH/g, the hydroxyl value of the copolymer B is in the range of 5-60 mg KOH/g, and the hydroxyl value of the hydroxyl acrylic polymer particles with a core-shell structure is in the range of 40-150 mg KOH/g, and preferably the hydroxyl value of the hydroxyl acrylic polymer particles with a core-shell structure is in the range of 42-80 mg KOH/g. The hydroxyl value is measured by titration according to ISO 4629.

According to the present application, each of the copolymer A and the copolymer B is formed of the following monomers:

a) C1-C20 alkyl (meth)acrylates;
b) optionally, vinyl aromatic compounds having up to 20 carbon atoms;
c) ethylenically unsaturated, acid-functional monomers; and
d) hydroxyl C1-C20 alkyl (meth)acrylate.

Within the context of the present application, the term "(meth)acrylates" denotes acrylates, methacrylates and mixtures thereof. Suitable C1-C20 alkyl methacrylates include, but are not limited to, methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, 2-ethylhexyl methacrylate, nonyl methacrylate, 2-methyloctyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates (such as, for example, cyclopentyl methacrylate, cyclohexyl methacrylate, 3-vinyl-2-butylcyclohexyl methacrylate, cycloheptyl methacrylate, cyclooctyl methacrylate), bornyl methacrylate, and isobornyl methacrylate. Preference is given to methyl methacrylate, ethyl methacrylate, butyl methacrylate, or tert-butyl methacrylate, and particular preference is given to methyl methacrylate, tert-butyl methacrylate or butyl methacrylate.

Suitable C1-C20 alkyl acrylates include, but are not limited to, methyl acrylate, ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, 2-ethylhexyl acrylate, nonyl acrylate, 2-methyl-octyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates (such as, for example, cyclopentyl acrylate, cyclohexyl acrylate, 3-vinyl-2-butylcyclohexyl acrylate, cycloheptyl acrylate, cyclooctyl acrylate), bornyl acrylate, and isobornyl acrylate. Preference is given to ethyl acrylate, n-butyl acrylate, ethylhexyl acrylate, or cyclohexyl acrylate, and particular preference is given to ethyl acrylate, n-butyl acrylate, or ethylhexyl acrylate.

Suitable vinyl aromatic compounds b) having up to 20 carbon atoms include, but are not limited to, styrene, vinyltoluene, o- and p-methylstyrene, α-butylstyrene, 4-n-butylstyrene, 4-n-decylstyrene, halogenated styrenes, such as, for example, monochlorostyrenes, dichlorostyrenes, tribromostyrenes or tetrabromostyrenes. Styrene is preferred.

Suitable ethylenically unsaturated, acid-functional monomers c) include, but are not limited to, phosphate- or carboxylic acid-functional monomers, preference being given to carboxylic acid-functional monomers such as acrylic acid, methacrylic acid, β-carboxyethyl acrylate, crotonic acid, fumaric acid, maleic anhydride, itaconic acid or monoalkyl esters of dibasic acids or anhydrides such as, for example, maleic acid monoalkyl esters. Particular preference is given to acrylic or methacrylic acid, and acrylic acid is most particularly preferred.

Also suitable as compounds of component c) are unsaturated, radically polymerisable compounds having phosphate or phosphonate or sulfonic acid or sulfonate groups, as are described, for example, in WO 00/39181 (p. 8, 1. 13-p. 9, 1. 19).

Examples of suitable hydroxyl C1-C20 alkyl (meth)acrylates include, but are not limited to, hydroxyethyl methacrylate, hydroxypropyl methacrylate, hydroxybutyl methacrylate, hydroxyethyl acrylate, and hydroxypropyl acrylate, or hydroxybutyl acrylate.

In one embodiment of the present application, the monomers for forming the copolymer A comprise 45-75 wt % of component a), 0-10 wt % of component b), 4-15 wt % of component c), and 10-45 wt % of component d), based on the total weight of components a), b), c) and d).

In one embodiment of the present application, the monomers for forming the copolymer A comprise 45-75 wt % of component a), 0-10 wt % of component b), 4-15 wt % of component c), and 1-30 wt % of component d), based on the total weight of components a), b), c) and d).

In one embodiment of the present application, the monomers for forming the copolymer B comprise 50-85 wt % of component a), 0-20 wt % of component b), 0.5-5 wt % of component c), and 10-35 wt % of component d), based on the total weight of components a), b), c) and d).

In one embodiment of the present application, the weight ratio of the monomers for forming the copolymer A to the monomers for forming the copolymer B ranges from 1:5 to 4:1, preferably from 1:2 to 2:1.

In the present application, the film-forming resin composition may optionally further comprise conventional additives which do not adversely affect the two-component waterborne polyurethane coating composition or the cured coating obtained therefrom. Suitable additives include, for example, the agents that can improve the processability or manufacturing properties of the composition, enhance the aesthetics of the composition, or improve the specific functional properties or properties of the coating composition or the cured composition obtained therefrom (such as adhesion to the substrate), or reduce the cost. Examples of such additives are for example fillers, lubricants, coalescing agents, wetting agents, plasticizers, defoamers, colorants, antioxidants, flow control agents, thixotropic agents, dispersants, adhesion promoters, UV stabilizers, thickeners, pH adjusters, solvents, or combination thereof. The content of each optional ingredient is sufficient to achieve its intended purpose, but preferably such content does not adversely affect the two-component waterborne polyurethane coating composition or the cured coating obtained therefrom. In the preferred embodiment of the present application, the film-forming resin composition of the present application may contain a thicker, a dispersant, a defoamer, a wetting agent, a pH adjuster, a filler, a coalescing agent, a fungicide, a preservative, or any combination thereof as conventional additives. According to the present application, the total amount of conventional additives ranges from 0.1 wt % to about 10 wt %, relative to the total weight of the film-forming resin composition.

In one embodiment of the present application, the film-forming resin composition according to the present application comprises: relative to the total weight of the film-forming resin composition, 70-85 wt % of an aqueous dispersion of core-shell hydroxyl acrylic resin polymer particles;
5-15 wt % of water;
2-8 wt % of coalescing agents; and
0-2 wt % of other additional additives selected from one or more of defoamers, surfactants, wetting agents and thickeners;
wherein the total amount of all components is 100 wt %.

As examples of coalescing agents, alcohols, such as ethylene glycol, propylene glycol, hexanediol, benzyl alcohol, etc.; alcohol esters, such as dodecyl alcohol ester; alcohol ethers, such as ethylene glycol butyl ether, propylene glycol methyl ether, propylene glycol ethyl ether, propylene glycol n-propyl ether, propylene glycol butyl ether, dipropylene glycol methyl ether, dipropylene glycol propyl ether, dipropylene glycol butyl ether, tripropylene glycol n-butyl ether, etc.; alcohol ether esters, such as hexylene glycol butyl ether acetate etc, can be used. As an example of a defoamer, BYK 028 available from BYK Company can be used. As an example of a surfactant, BYK 341 available from BYK Company can be used. As an example of a wetting agent, BYK 348 available from BYK Company can be used. As an example of a thickener, ACRYSOL RMTM-2020E can be used. The film-forming resin composition of the present application comprises an aqueous dispersion of hydroxyl acrylic polymer particles having a specific core-shell structure, wherein the hydroxyl acrylic polymer particles with a core-shell structure comprise an outer shell formed of copolymer A and an inner core formed of copolymer B, the outer shell is soft and has a lower glass transition temperature, and the inner core is hard and has a higher glass transition temperature, and the core-shell ratio is appropriate.

Such aqueous dispersion of hydroxyl acrylic polymer particles having a structure of a soft shell and a hard core provides good film-forming properties, and only a small amount of coalescing agents are needed to form a film, which greatly reduces the VOC content in the coating and makes the coating more consistent with the environmental requirements. The inventors surprisingly found that the coating formed by using such aqueous dispersion of hydroxyl acrylic polymer particles having a structure of a soft shell and a hard core have a large number of microporous structures, which was difficult to foresee before this application. Without being bound by any theory, the applicant speculates that such surface microporous structure may be the main reason for the low gloss of the coating.

In addition, in the aqueous dispersion of hydroxyl acrylic polymer particles of the present application, the hydroxyl groups are mainly distributed in the outer shell part of the emulsion, thereby increasing the probability of contacting with the polyisocyanate crosslinking agent and increasing the crosslinking density of the coating. Thus the hardness and chemical resistance of the coating are significantly improved, and the amount of polyisocyanate crosslinking agent required for curing is also significantly reduced.

The emulsion polymerization technology for preparing the aqueous latex from ethylenically unsaturated monomers is well known in the polymer field, and any conventional emulsion polymerization process can be used, such as a single-stage polymerization process, a multi-stage polymerization process, a continuous process, and the like. It is well known that a seed polymerization process can be used to prepare an aqueous latex in order to control the structure and composition of the polymer particles contained in the aqueous latex.

In the embodiments of the present application, the aqueous latex is prepared as follows: a) under the action of a suitable emulsifier and with the aid of stirring, the monomer mixture is dispersed in water into an emulsion, and then the formulated emulsion is added dropwise to a polymerization reactor containing an initiator to carry out the polymerization, so as to form a seed emulsion as a polymer shell; b) next, in the presence of the seed emulsion, another monomer mixture is used to swell the formed seed emulsion, and the above-mentioned another monomer mixture undergoes in-situ emulsion polymerization to form polymer particles with a core-shell structure.

Thus, according to another aspect, the present application provides a method for preparing an aqueous dispersion of core-shell hydroxyl acrylic resin polymer particles, comprising the following steps: 1) providing a monomer mixture for forming copolymer A: in the presence of water, emulsifier and a part of initiator, 1-20% by weight of the monomer mixture is added metrically, relative to the total weight of the monomer mixture for forming the copolymer A, and then the remaining monomer mixture for forming copolymer A and the remaining initiator are added metrically for emulsion polymerization to obtain an aqueous emulsion containing the copolymer A, wherein the solid content of the aqueous emulsion is controlled within the range of 20-30% by weight; and 2) providing a monomer mixture for forming copolymer B: the monomer mixture for forming the copolymer B is used to swell the resulting aqueous emulsion, and then the monomer mixture for forming the copolymer B is subjected to an in-situ emulsion polymerization, to obtain an aqueous dispersion of hydroxyl acrylic polymer particles with a core-shell structure, wherein the hydroxyl acrylic polymer particles with a core-shell structure include copolymer A as the outer shell and copolymer B as the inner core, and wherein the solid content is controlled within the range of 30-45% by weight.

Dispersion of the above polymerizable monomers can be accomplished with the aid of any known emulsifier. Examples of useful emulsifiers include any well-known anionic surfactants, nonionic surfactants, or combinations thereof. For example, some suitable surfactants for emulsion polymerization are disclosed in McCutcheon's Detergents and Emulsifiers (MC Publishing Co., Glen Rock, N.J.). Other types of stabilizing agents can also be used, such as protective colloids. Preferably, a combination of an anionic surfactant and a nonionic surfactant is used. Nonionic surfactants include alkyl phenol polyoxyethylene ethers, fatty alcohol polyoxyethylene ethers. Preferably, alkylphenol polyoxyethylene ethers are used. Anionic surfactants include aliphatic carboxylates, aliphatic sulfonates, aliphatic sulfates, and aliphatic phosphates. Preferably, their salts of alkali metals such as Na, K or Li, or of alkaline earth metal salts such as Ca or Ba are used. In a specific embodiment, aliphatic sulphonates, preferably alkali dodecylsulphonates, more preferably sodium dodecylsulphate (SDS), are used.

Any known free radical initiator can be used to initiate the polymerization reaction. Examples of useful initiators include initiators that thermally decompose to produce free radicals at the polymerization temperature. Examples include water soluble and water insoluble initiators. Examples of radical-generating initiators include persulfates such as ammonium persulfate or alkali persulfate (including potassium, sodium or lithium); peroxides such as cumene hydroperoxide, tert-butyl hydroperoxide, di-tert-butyl peroxide, dioctyl peroxide, tert-butyl pervalerate, tert-butyl perisononate, tert-butyl peroctoate, tert-butyl perneodecanoate, peroxyl di(2-ethylhexyl)dicarbonate, bis(isotridecyl) peroxydicarbonate; azo compounds such as azobis(isobutyronitrile) and azobis(4-cyanovaleric acid)); and conventional redox systems. Preferably, a water-soluble initiator persulfate is used. More specifically, ammonium persulfate is used as a radical initiator.

According to the present application, in the preparation process of copolymer A, a chain transfer agent is optionally added, and the chain transfer agent includes, but is not limited to, one or more of n-dodecyl mercaptan, isooctyl 3-mercaptopropionate and α-methyl styrene dimer, etc., preferably n-dodecyl mercaptan.

In the preparation of the aqueous dispersion of core-shell hydroxyl acrylic resin polymer particles of the present application, the amounts of the emulsifier and the initiator and the reaction conditions such as the reaction temperature, the stirring speed, and the like can be determined empirically by those skilled in the art. Preferably, the pre-emulsification process of the monomers mixture is performed at a stirring speed of 2000 rpm or more, preferably at a stirring speed of 4000 rpm or more.

Polyisocyanate Crosslinker

The term "polyisocyanate crosslinker" as used herein refers to a polyisocyanate compound, an isocyanate oligomer, or a combination thereof. The polyisocyanate crosslinker contains two or more isocyanate functional groups, which can undergo chain extension and crosslinking reactions with the film-forming resin composition, thereby forming a three-dimensional network structure in the coating.

Suitable polyisocyanate crosslinker include aliphatic polyisocyanates, aromatic polyisocyanates, or any combination thereof. The term "aliphatic polyisocyanate" as used herein refers to a polyisocyanate compound in which an isocyanate group is directly connected to an aliphatic chain or ring. The term "aromatic polyisocyanate" as used herein refers to a polyisocyanate compound in which an isocyanate group is directly connected to an aromatic ring.

As examples of suitable polyisocyanate compounds, hexamethylene diisocyanate, dodecamethylene diisocyanate, cyclohexane-1,4-diisocyanate, 4,4'-dicyclohexylmethane diisocyanate, cyclopentane-1,3-diisocyanate, p-phenylene diisocyanate, toluene-2,4-diisocyanate, naphthalene-1,4-diisocyanate, biphenyl-4,4'-diisocyanate, benzene-1,2,4-triisocyanate, xylene-1,4-diisocyanate, xylene-1,3-diisocyanate, diphenylmethane diisocyanate, butane-1,2,3-triisocyanate or polymethylene polyphenyl polyisocyanate can be used.

As examples of suitable isocyanate oligomers, polyurethane prepolymers of any of the polyisocyanate compounds listed above, polyester prepolymers of any of the polyisocyanate compounds listed above, or polyether prepolymers of any of the polyisocyanate compounds listed above can be used. The polyurethane prepolymer, polyester prepolymer or polyether prepolymer can be made by any suitable method known to those skilled in the art. For example, a polyurethane prepolymer can be made by reacting a polyol monomer with one or more of the polyisocyanate compounds under appropriate conditions; a polyester prepolymer or a polyether prepolymer can be made by reacting a polyester polyol or polyether polyol with one or more of the polyisocyanate compounds under appropriate conditions. Alternatively, as the polyurethane prepolymer, polyester prepolymer, or polyether prepolymer, any appropriate commercial product can be used.

Preferred polyisocyanate crosslinkers are unblocked or blocked polyisocyanates, more preferably hydrophilic group-modified and/or at least partially hydrophilic group-modified, unblocked polyisocyanates, even more preferably hydrophilic groups modified polyisocyanates.

In one embodiment of the present application, the polyisocyanate crosslinker is a hydrophilic group-modified polyisocyanate crosslinker.

As an example of the polyisocyanate crosslinker, any suitable commercially available product, such as Bayhydur® XP 2655 (Hexamethylene Diisocyanate (HDI)-based hydrophilic aliphatic polyisocyanate) from Coverstro, can be used.

According to the present application, the amount of the polyisocyanate crosslinker and the film-forming resin composition is selected such that the molar ratio of the hydroxyl group (OH) to the isocyanate group (NCO) in the resulting system varies from 1:1 to 1:2.5. Generally speaking, when the molar ratio of hydroxyl group (OH) to isocyanate group (NCO) is less than 1:2.5, the handling performance of the resulting two-component polyurethane topcoat and/or the mechanical properties of the resulting coating may decrease. When the molar ratio of the hydroxyl group (OH) to the isocyanate group (NCO) is greater than 1:1, the curing performance of the resulting coating is poor. According to actual needs, an additional inert diluent that will not affect the reactivity of the above film-forming resin composition and polyisocyanate crosslinker can be added during the preparation of the film-forming resin composition and/or polyisocyanate crosslinker, to reduce the viscosity of each component, for example. Therefore, the amount of the film-forming resin composition and the polyisocyanate crosslinker is not limited to the above range, and can be adjusted according to actual needs.

According to the present application, the two-component waterborne polyurethane coating composition can be prepared by simply mixing the film-forming resin composition and the polyisocyanate crosslinker in a mixing device in a predetermined weight ratio before application. The mixed two-component waterborne polyurethane coating composition can be applied using various methods familiar to those skilled in the art, including spraying (for example, air-assisted, airless or electrostatic spraying), brushing, roller coating, overflow coating, and dipping. In one embodiment of the present application, the mixed two-component waterborne polyurethane coating composition is applied by spraying. The two-component waterborne polyurethane coating composition can be applied into a wet film with various thicknesses. In the embodiment of the present application, the thickness of wet film preferably provides a dry film with a thickness of about 13 to about 260 μm, and more preferably about 75 to about 150 μm. The applied coating can be cured by air-drying or by using various drying devices (for example, an oven) familiar to those skilled in the art to accelerate the curing.

In another aspect of the present application, a low-gloss coating is provided, which is characterized in that the low-gloss coating has a gloss of 75 or less at 60°, and the low-gloss coating is formed from the two-component waterborne polyurethane coating composition according to the present application.

In one embodiment of the present application, the low-gloss coating has a gloss of 60 or less at 60°.

According to the present application, the low-gloss coating has micropores on the surface thereof, and the micropores have an average diameter ranging from 1 to 10 μm, preferably from 5 to 10 μm.

According to the present application, the low gloss coating has micropores on the surface thereof, and the micropores have an average depth ranging from 0.1 to 2 μm, preferably from 0.3 to 1.5 μm. In the context of this application, the "average depth" refers to the sum of the maximum profile peak height Zp and the maximum profile valley depth Zv of the micropore within a sampling length, and the average of multiple measurements is taken.

Therefore, the present application also relates to the use of the two-component waterborne polyurethane coating composition according to the present application in preparing a low-gloss coating, wherein the low-gloss coating has a gloss of 60 or less at 60°.

Testing Method

Unless otherwise indicated, the following test methods were used in the following examples.

Viscosity

A NK-2 viscosity cup was used to measure the viscosity of the aqueous dispersion of polymer particles according to ASTM D 4212, in seconds(s).

Air Drying Time

The air drying time was measured according to GB/T 1728-1979 (1989).

Pendulum Hardness

The pendulum hardness was used to measure curing performances of cured system. The measurement was carried out in accordance with GB/T 1730-2007.

Gloss

This test was used to measure gloss of cured coating. The Sheen orifice gloss meter was used to evaluate 60° gloss according to ASTM D523.

Pencil Hardness

This test was used to measure hardness of cured coating. Pencil hardness was evaluated using ASTM D3363. The data was reported as the pencil hardness of the last successful test before the coating broke. Thus, for example, if the coating is not broken when tested with a 2H pencil, but cracked when tested with a 3H pencil, the coating is reported to have a pencil hardness of 2H.

Adhesion

An adhesion test was performed to evaluate whether the coating adheres to the coated substrate. The adhesion test was carried out according to ASTM D 3359-Test Method B. Adhesion is usually divided into a 0-5B scale, where 5B represents the best adhesion.

Chemical Resistance Test

According to ASTM F2250-Test Method B, a resistance test of solvents (such as ethanol, coffee, red wine, etc.) was performed to evaluate the degree of "curing" or crosslinking of the coating. Finally, the integrity of the coating was determined. Chemical resistance is usually divided into 0-5 grades, where 5=complete coating, no stains, no delamination (best), 4=almost no stains on the coating, 3=clearly confirming that the coating has stain, 2-coating discoloration and partial delamination, 0=coating peeling (worst).

Surface Imaging

The sample surface was imaged by an optical microscope in dark field mode. The microscope used was Keyence VHX-5000 with a Z1000 lens.

Examples

The present disclosure is further described in the following examples that are intended as illustrations only. It is to be understood that the particular examples, materials, amounts, and procedures are to be interpreted broadly in accordance with the scope and spirit of the present inventions as set forth herein.

Unless otherwise noted, all parts, percentages, and ratios reported in the following examples are on a weight basis. Unless otherwise specified, all chemicals are used are commercially available.

Materials

The materials used are listed in Table 1 below.

TABLE 1

Materials used and related information

| Component | Brief description |
| --- | --- |
| DIW | Deionized water |
| MMA | Methyl methacrylate, available from J&K Scientific Ltd. |
| St | Styrene, available from J&K Scientific Ltd. |
| 2-EHA | 2-Ethylhexyl acrylate, available from J&K Scientific Ltd. |
| HEMA | Hydroxyethyl methacrylate, available from J&K Scientific Ltd. |
| MAA | Methacrylic acid, available from J&K Scientific Ltd. |
| NDM | N-Dodecyl mercaptan, as a chain transfer agent, available from J&K Scientific Ltd. |
| SDS | sodium dodecylsulphate, as an emulsifier, available from J&K Scientific Ltd. |
| APS | Ammonium persulfate, as a free radical initiator, available from J&K Scientific Ltd. |
| DPM | Dipropylene glycol methyl ether, as a film forming aid, available from DOW |
| DPNB | Dipropylene glycol butyl ether, as a film forming aid, available from DOW |
| WQ1321P | Comparative aqueous hydroxyl acrylic dispersion, available from Valspar |
| OH-7 | Comparative aqueous hydroxyl acrylic dispersion, available from Valspar |
| OH-8 | Comparative aqueous hydroxyl acrylic dispersion, available from Valspar |
| Bayhydur ® XP2655 | Crosslinker, available from Covestro |

TABLE 2

Properties of the comparative aqueous hydroxyl acrylic dispersions

| Properties | WQ1321P | OH-7 | OH-8 |
| --- | --- | --- | --- |
| Solid content | 44.3% | 41.5% | 42.4% |
| Viscosity (s) | 13.39 | 15.62 | 17.01 |
| pH value | 8.01 | 8.25 | 8.33 |
| Tg | / | 65 | 75 |
| Hydroxyl value (mg KOH/g) | 40 | 16 | 16 |

Preparation of Aqueous Dispersion of Hydroxyl Acrylic Polymer Particles with a Core-Shell Structure An aqueous dispersion of hydroxyl acrylic polymer particles with a core-shell structure was prepared by using the ingredients shown in Table 3 below. The specific steps were as follows: the monomer mixture M1 was first emulsified with 0.3 wt % of SDS emulsifier and 70 wt % of DIW. In a mixed atmosphere of nitrogen and oxygen, 5 wt % of M1 solution was added into a four-necked flask containing SDS, APS and DIW and equipped with a thermometer, overhead stirrer, and gas inlet, and then heated to 80-90° C. and kept under stirring for 20 minutes, and then the remaining M1 solution and APS solution were added dropwise in about 100 minutes and 120 minutes, respectively. Then, the resulting mixture was stirred at 85° C. for another hour, cooled to 50° C., and adjusted to pH 7.0-8.0 with ammonium hydroxide to obtain copolymer A. The solid content of copolymer A was controlled within the range of 20-30% by weight.

When the solution in the reactor was cooled to room temperature, monomer mixture M2 was added and stirred for 30 minutes, then added dropwise to another four-necked flask containing SDS, APS and DIW and equipped with thermometer, overhead stirrer, and gas inlet, and then heated to 80-90° C. while stirring. At the same time, the APS solution was dropped into the reactor to initiate polymerization. The dropping was controlled within 100-120 minutes. Then the resulting mixture was stirred at 85° C. for another 1 hour, cooled to 50° C., and adjusted to pH 7.0-8.0 with ammonium hydroxide. The corresponding latex solution was discharged through a 125 μm filter to obtain a core-shell latex. The solid content of latex was controlled within the range of 35-45 wt %.

TABLE 3

| Item# | Materials | Weight parts | | | | |
|---|---|---|---|---|---|---|
| | | Sample 1 | Sample 2 | Sample 3 | Sample 4 | Sample 5 |
| M1 | MMA | 100 | 75 | 125 | 140 | 200 |
| | St | — | 30 | 15 | 30 | 15 |
| | 2-EHA | 175 | 200 | 150 | 130 | 130 |
| | HEMA | 80 | 80 | 80 | 100 | 280 |
| | MAA | 40 | 40 | 40 | 24 | 30 |
| | NDM | 15.8 | 15.8 | 15.8 | 4 | 20 |
| | Tg1 | 16.3 | 9 | 29.4 | 10.5 | 35.6 |
| M2 | MMA | 154 | 398 | 398 | 200 | 200 |
| | St | — | 40 | 40 | 10 | 10 |
| | 2-EHA | 200 | 100 | 90 | 35 | 35 |
| | HEMA | 244 | 100 | 100 | 40 | 40 |
| | MAA | 6 | 6 | 7 | 8 | 8 |
| | NDM | 2.8 | 3 | 2.8 | 2.9 | 2 |
| | Tg2 | 16.3 | 56.5 | 65 | 58.6 | 62.5 |

According to the test section, the latex properties of sample 1 were measured, including solid content, viscosity, pH, Tg, and hydroxyl value. The results were listed in Table 4 below.

TABLE 4

| Sample 1 | Solid content | Viscosity (s) | pH value | Tg | Hydroxyl value (mg KOH/g) |
|---|---|---|---|---|---|
| Results | 40.5% | 14.01 | 7.57 | 25 | 44 |

Preparation of Film-Forming Resin Composition

The film-forming resin composition was prepared by using the ingredients shown in Table 5 below. Under stirring, the coalescing agent, water and additional additives were added to the aqueous dispersion of hydroxyl acrylic polymer particles with a core-shell structure of samples 1-5 to form a film-forming resin composition. For comparison, the aqueous hydroxyl acrylic dispersions WQ1321P, OH-7 and OH-8 from Valspar were used to prepare film resin compositions as Comparative Examples 1-3.

Preparation of Two-Component Waterborne Polyurethane Coating Composition

Before use, the film-forming resin composition prepared above was mixed with Bayhydur® XP2655 (a hydrophilic aliphatic polyisocyanate based on hexamethylene diisocyanate (HDI) from Coverstro) in a certain ratio.

Coating Formation

An appropriate amount of the above two-component waterborne polyurethane coating composition was stretched on an aged PU board to form a 120 micron coating. Then, the coated panel thus formed was dried in the air for 30 minutes, dried at 50° C. for 10 minutes, and then cooled in the air.

According to the methods listed in the test method, the pendulum hardness, gloss, adhesion, chemical resistance and other properties of the cured coating were measured, and the results were shown in Table 6. Before the test, the coating formed above was dried in air for 7 days.

TABLE 5

| Composition of film-forming resin composition | | | | | | | | |
|---|---|---|---|---|---|---|---|---|
| Composition (wt %) | Example 1 | Example 2 | Example 3 | Example 4 | Example 5 | Comparative Example 1 | Comparative Example 2 | Comparative Example 3 |
| Sample 1 | 80 | | | | | | | |
| Sample 2 | | 80 | | | | | | |
| Sample 3 | | | 80 | | | | | |
| Sample 4 | | | | 80 | | | | |
| Sample 5 | | | | | 80 | | | |
| WQ1321P | | | | | | 80 | | |
| OH-7 | | | | | | | 80 | |
| OH-8 | | | | | | | | 80 |
| DPM | 3.2 | 3.2 | 3.2 | 3.2 | 3.2 | 3.2 | 3.2 | 3.2 |
| DPNB | 3.2 | 3.2 | 3.2 | 3.2 | 3.2 | 3.2 | 3.2 | 3.2 |
| Water | 11.6 | 11.6 | 11.6 | 11.6 | 11.6 | 11.6 | 11.6 | 11.6 |
| Additional additives | 2 | 2 | 2 | 2 | 2 | 2 | 2 | 2 |
| Total (wt %) | 100 | 100 | 100 | 100 | 100 | 100 | 100 | 100 |

TABLE 6

Coating performance

| Sample | Example 1 | | | Example 2 | | | Example 3 | | | Example 4 | | | Example 5 | | | Comparative Example 1 | | | Comparative Example 2 | | | Comparative Example 3 | | |
|---|---|---|---|---|---|---|---|---|---|---|---|---|---|---|---|---|---|---|---|---|---|---|---|---|
| OH/NCO | 1/1 | 1/1.5 | 1/2 | 1/1 | 1/1.5 | 1/2 | 1/1 | 1/1.5 | 1/2 | 1/1 | 1/1.5 | 1/2 | 1/1 | 1/1.5 | 1/2 | 1/1 | 1/1.5 | 1/2 | 1/1 | 1/1.5 | 1/2 | 1/1 | 1/1.5 | 1/2 |
| Gloss (sheen, 20°) | 17 | 14 | 16 | 4 | 13 | 18 | 20 | 12 | 17 | 22 | 7 | 4 | 50 | 40 | 28 | 64 | 54 | 54 | 22 | 42 | 41 | 22 | 42 | 41 |
| Gloss (sheen, 60°) | 54 | 52 | 58 | 30 | 50 | 53 | 53 | 47 | 50 | 53 | 34 | 23 | 74 | 68 | 58 | 92 | 91 | 91 | 79 | 80 | 84 | 84 | 81 | 82 |
| Adhesion | 5B | 5B | 5B | 5B | 5B | 5B | 5B | 5B | 5B | 5B | 5B | 5B | 5B | 5B | 5B | 5B | 5B | 5B | 5B | 5B | 5B | 5B | 5B | 5B |
| Pencil hardness | H | 2H | 2H | H | H | H | H | H | H | H | H | H | H | H | H | HB | HB | H | H | H | 2H | H | H | 2H |
| Pendulum hardness | 110 | 125 | 128 | 104 | 105 | 110 | 92 | 98 | 105 | 103 | 102 | 105 | 102 | 105 | 110 | 100 | 123 | 125 | 123 | 120 | 125 | 123 | 123 | 125 |
| Air drying time (min) | 56 | 53 | 55 | 22 | 31 | 38 | 18 | 20 | 20 | 25 | 30 | 35 | 18 | 22 | 30 | 98 | 109 | 180 | 22 | 18 | 18 | 21 | 21 | 21 |
| Chemical resistance | | | | | | | | | | | | | | | | | | | | | | | | |
| 50% Ethanol (1 h) | 4 | 4 | 5 | 4 | 5 | 5 | 4 | 5 | 5 | 4 | 4 | 5 | 4 | 5 | 5 | 4 | 4 | 4 | 4 | 4 | 5 | 4 | 4 | 4 |
| 10% NH$_4$OH (1 min) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| 50 g/L NaHCO$_3$ (1 h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| 10% Na$_2$CO$_3$ (1 h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| 10% Acetic acid (h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Water (24 h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| 4% Coffee (1 h) | 5 | 5 | 5 | 5 | 5 | 5 | 5 | 5 | 5 | 5 | 5 | 5 | 5 | 5 | 5 | 5 | 5 | 5 | 4 | 4 | 5 | 4 | 4 | 4 |
| 1% Tea (1 h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Red wine (h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Vinegar (1 h) | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Hot water (50 min) | 4 | 4 | 4 | 5 | 5 | 5 | 5 | 5 | 5 | 5 | 5 | 5 | 5 | 5 | 5 | 4 | 4 | 4 | 4 | 4 | 4 | 4 | 4 | 4 |

As can be seen from the results in Table 6 above, compared with other aqueous acrylic latexes from Valspar, the two-component waterborne polyurethane coating composition according to the present application, after curing, obtained a coating with significantly lower gloss. The low-gloss coating had a gloss of 75 or less at 60°. In addition, the coating had acceptable coating properties, including adhesion, hardness, and chemical resistance.

In order to further verify the reason for the low gloss of the coating formed by the aqueous acrylic latex of the present application, the inventor compared the performance, especially the difference in gloss, and the applicant separately analyzed the coating formed from Examples 1-5 and other commercially available acrylic emulsions, such as the water-based hydroxyl acrylic dispersion of Bayhydrol® XP 2470, the MT2008# film-forming resin of Guangdong Huaguoshan Environmental Protection Technology Co., Ltd., and the core-shell hydroxyl acrylic resin emulsion prepared according to Example 7 of CN107434842A. The coatings were imaged, and the images were shown in FIGS. 1-8.

It can be seen from the results of the Figs that the two-component waterborne polyurethane coating composition according to the present application had a large number of micropores formed on the coating surface after curing, which was significantly different from the coating in the prior art.

All patents, patent applications and publications cited herein, as well as all disclosures of electronically available materials, are incorporated herein by reference. The foregoing detailed description and examples of the invention are only given for clear understanding. It cannot be understood as an unnecessary limitation. The application is not limited to the precise details shown and described, and variations obvious to those skilled in the art will be included in the application defined by the claims. In some embodiments, the present application illustratively disclosed herein can be implemented without any element not expressly disclosed herein.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A two-component waterborne polyurethane coating composition comprising:
   a film-forming resin composition, comprising an aqueous dispersion of hydroxyl acrylic polymer particles with a core-shell structure; and
   a polyisocyanate crosslinker,
   wherein the hydroxyl acrylic polymer particles with a core-shell structure comprise a shell formed by a copolymer A and an inner core formed by a copolymer B; and
   wherein the copolymer A has a glass transition temperature ranging from −20° C. to 60° C., the copolymer B has a glass transition temperature ranging from 20° C. to 100° C., and the hydroxyl acrylic polymer particles with a core-shell structure have a glass transition temperature ranging from 0° C. to 25° C.

2. The two-component waterborne polyurethane coating composition of claim 1, wherein the copolymer A has an acid value ranging from 3 to 40 mg KOH/g, the copolymer B has an acid value ranging from 0 to 10 mg KOH/g, and the hydroxyl acrylic polymer particles with a core-shell structure have an acid value ranging from 3 to 40 mg KOH/g.

3. The two-component waterborne polyurethane coating composition of claim 1, wherein the copolymer A has a hydroxyl value ranging from 40 to 150 mg KOH/g, the copolymer B has a hydroxyl value ranging from 5 to 60 mg KOH/g, and the hydroxyl acrylic polymer particles with a core-shell structure have a hydroxyl value ranging from 40 to 150 mg KOH/g.

4. The two-component waterborne polyurethane coating composition of claim 1, wherein the polyisocyanate crosslinker is a hydrophilic group modified polyisocyanate crosslinker.

5. The two-component waterborne polyurethane coating composition of claim 1, wherein each of the copolymer A and the copolymer B is formed from monomers comprising:
   a): C1-C20 alkyl (meth)acrylate;
   b): optionally a vinyl aromatic compound having up to 20 carbon atoms;
   c): ethylenically unsaturated, acid-functional monomer; and
   d): hydroxyl C1-C20 alkyl (meth)acrylate.

6. The two-component waterborne polyurethane coating composition of claim 5, wherein the monomers for forming the copolymer A comprise 45-75 wt % of component a), 0-10 wt % of component b), 4-15 wt % of component c), and 10-45 wt % of component d), based on the total weight of components a), b), c) and d).

7. The two-component waterborne polyurethane coating composition of claim 5, wherein the monomers for forming the copolymer A comprise 45-75 wt % of component a), 0-10 wt % of component b), 4-15 wt % of component c), and 1-30 wt % of component d), based on the total weight of components a), b), c) and d).

8. The two-component waterborne polyurethane coating composition of claim 5, wherein the monomers for forming the copolymer B comprise 50-85 wt % of component a), 0-20 wt % of component b), 0.5-5 wt % of component c), and 10-35 wt % of component d), based on the total weight of components a), b), c) and d).

9. The two-component waterborne polyurethane coating composition of claim 1, wherein the weight ratio between the copolymer A and the copolymer B ranges from 1:5 to 4:1.

10. The two-component waterborne polyurethane coating composition of claim 1, which is free of matting agent.

11. A low gloss coating formed from the two-component waterborne polyurethane coating composition according to claim 1, wherein the low gloss coating has a gloss of 75 or less at 60°.

12. The low gloss coating of claim 11, wherein the low gloss coating has a gloss of 60 or less at 60°.

13. The low gloss coating of claim 11, wherein the low gloss coating has micropores on the surface thereof, and the micropores have an average diameter ranging from 1 to 10 µm.

14. The low gloss coating of claim 11, wherein the low gloss coating has micropores on the surface thereof, and the micropores have an average depth ranging from 0.1 to 2 µm.

* * * * *